No. 689,929. Patented Dec. 31, 1901.
N. H. SUREN.
CONTROLLING DEVICE FOR CONNECTING STORAGE BATTERIES WITH CHARGING LINES.
(Application filed June 19, 1899.)
(No Model.)
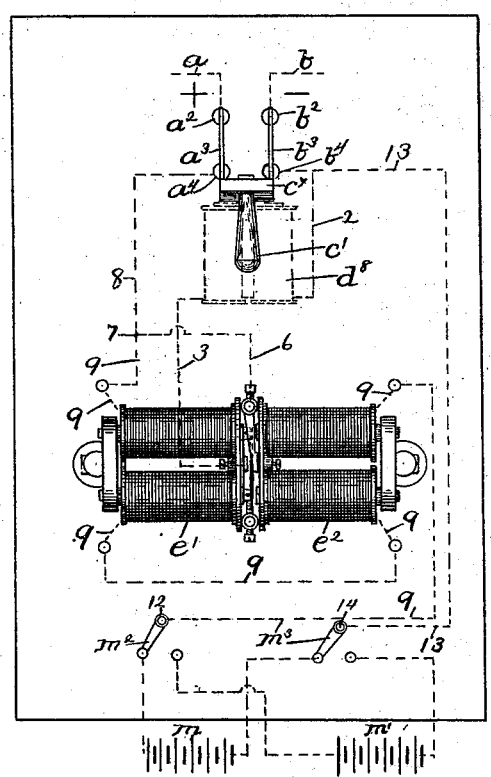
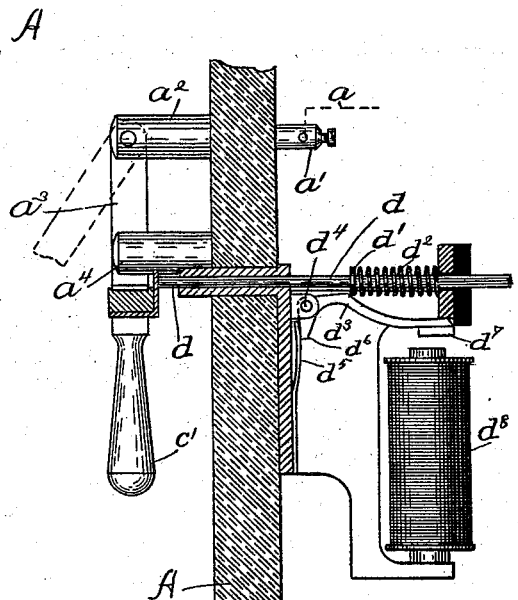
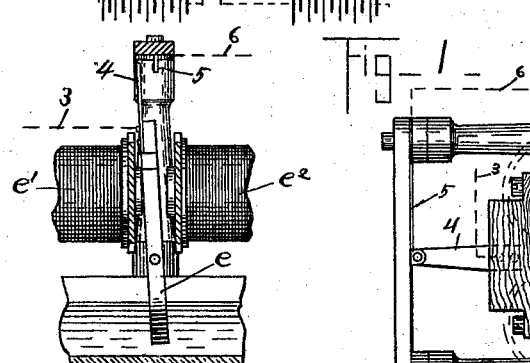
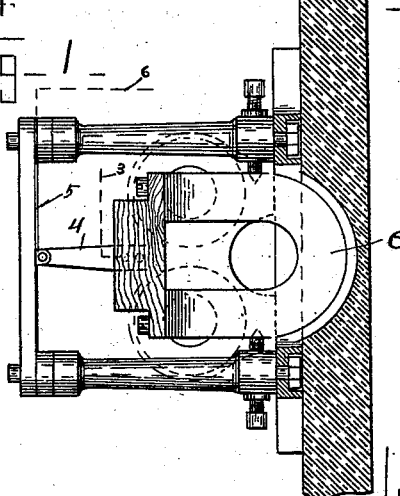
Witnesses:
H. B. Davis.
J. L. Hutchinson.
Inventor:
Nathan H. Suren
by B. J. Hayes
Atty.
THE NORRIS PETERS CO., PHOTO-LITHO., WASHINGTON, D. C.

UNITED STATES PATENT OFFICE.

NATHAN H. SUREN, OF NEEDHAM, MASSACHUSETTS, ASSIGNOR TO GAME-WELL FIRE ALARM TELEGRAPH COMPANY, OF NEW YORK, N. Y., A CORPORATION OF NEW YORK.

CONTROLLING DEVICE FOR CONNECTING STORAGE BATTERIES WITH CHARGING-LINES.

SPECIFICATION forming part of Letters Patent No. 689,929, dated December 31, 1901.

Application filed June 19, 1899. Serial No. 721,151. (No model.)

*To all whom it may concern:*

Be it known that I, NATHAN H. SUREN, of Needham, county of Norfolk and State of Massachusetts, have invented an Improvement in Controlling Devices for Connecting Storage Batteries with Charging-Lines, of which the following description, in connection with the accompanying drawings, is a specification, like characters on the drawings representing like parts.

At the present time it is customary in many places to use storage batteries for fire-alarm and police-signal systems and such storage batteries are charged at proper times by a current from a suitable charging-line. It is very important that the charging-line should be connected in correct polarity with the storage batteries, and when so connected it is also important that such condition of polarity should be maintained at all times to provide against injuring the storage batteries.

This invention has for its object to provide improved means whereby the charging-line will be instantly automatically disconnected from the storage-battery circuit if the storage battery is not connected in correct polarity or if for any reason the storage-battery circuit or the charging-current should be reversed.

Figure 1 shows in front elevation an automatic switch embodying this invention for disconnecting a charging-line from a storage battery in case it should not be connected in correct polarity or the polarity of either the charging-line or the battery should thereafter be reversed, the circuit-wires being represented in diagram for the purpose of illustrating the invention. Fig. 2 is a vertical section of the switch shown in Fig. 1 on an enlarged scale. Fig. 3 is a detail of a portion of the polarized relay, showing the permanently-magnetized armature in the position which it will occupy when the charging-line is connected in correct polarity.

$a\ b$ represent the two wires of the charging-line, they being connected to two binding-posts $a'$, which are secured to the back of the board A, and two studs or posts $a^2\ b^2$, which project from the front of said board, and to said studs or posts $a^2\ b^2$ the arms $a^3\ b^3$ of a knife-switch are pivoted, said arms $a^3\ b^3$ being connected together by a cross-piece $c$, to which a handpiece $c'$ is secured, which is employed as a means of operating the said knife-switch. The pivoted arms $a^3\ b^3$ of the knife-switch are adapted to engage the split ends of the posts $a^4\ b^4$ when the switch is closed.

$d$ represents a sliding rod or bar which passes through and has its bearings in the board A, acting as a plunger-rod, and said rod or bar $d$ has formed on it or it may be provided with a projection $d'$, and a spiral spring $d^2$ encircles said rod, which tends to thrust it longitudinally in one direction. A detent $d^3$, pivoted at $d^4$, is provided for engaging the projection $d'$, and thereby holding the plunger rod or bar $d$ with the spring $d^2$ compressed. The detent $d^3$ is held pressed up into engagement with said projection $d'$ by a flat spring $d^5$ bearing upon a projection $d^6$ on the detent. The detent $d^3$ carries the armature of an electromagnet $d^8$, and when said armature is attracted said detent $d^3$ will be moved to disengage the projection $d'$, and thereby release the spring-pressed rod or bar $d$. The spring-pressed rod or bar $d$ occupies a position relative to the knife-switch whereby the latter engages it when closed and thrusts it inward to compress the spring $d^2$ and lock the rod or bar on the detent $d^3$; but whenever said rod or bar is released it will in turn disengage said knife-switch from the posts $a^4\ b^4$ by positively moving it into the dotted-line position shown in Fig. 2. The electromagnet $d^8$ thus trips the mechanism by means of which the knife-switch is positively yet automatically opened, and hence may be termed the "tripper-magnet."

The tripper-maget $d^8$ (see dotted lines, Fig. 1) is connected by a wire 2 with the post $b^4$, and said tripper-magnet $d^8$ is connected by wire 3 with a contact-plate 4, borne by the permanently-magnetized armature $e$ of a polarized relay, which, as herein shown, comprises, essentially, two pairs of electromagnets $e'\ e^2$, which are disposed with their poles facing each other and having said permanently-magnetized armature $e$ pivotally supported between them. The contact-plate 4, carried by said pivoted armature $e$, is adapted to engage the contact 5 when drawn toward one pair of magnets—as $e^2$, for instance—and said contact 5 is connected by a wire 6 with a terminal point 7, which is connected by a wire 8 with the post $a^4$ of the knife-switch.

It will be seen that whenever the knife-switch is closed and the pivoted armature $e$ moved so that its contact-plate 4 closes on said contact 5 the circuit of the tripper-magnet $d^8$ will be closed and said magnet thereby energized and the switch automatically opened by means of the spring-pressed rod or bar $d$, which is released by the detent $d'$.

The electromagnets $e'$ $e^2$ of the polarized relay are included in an intermediate branch circuit comprising the wires 8 and 9, and said wire 8 is connected to the post $a^4$ and will thereby be connected to the positive pole of the charging-line by the closure of said knife-switch, and said wire 9 is connected to the terminal 12 of the switch $m^2$ and will thereby be connected with one of the storage-battery terminals. The wire 13 leads from the post $b^4$ to the terminal 14 of the switch $m^3$ and will thereby be connected to the other terminal of the storage battery.

As herein shown, the positive terminal of the charging-circuit will be connected with the post $a^2$ and the negative terminal of the charging-circuit will be connected with the post $b^2$, and consequently the positive terminal of the storage battery will be connected to the terminal 12 and the negative terminal of the storage battery will be connected to the terminal 14, and if the connections are thus properly made the permanently-magnetized armature $e$ will be drawn toward the poles of the magnet $e'$, and the circuit of the tripper-magnet $d^8$ will remain open, and consequently the knife-switch will remain closed and the storage battery gradually become charged; but if the charging-line should not be thus connected in correct polarity, or if the polarity of the charging-current or of the storage battery should be reversed, then the permanently-magnetized armature $e$ would immediately be drawn toward the poles of the magnet $e^2$, closing the contacts 4 5, and thereby closing the circuit of the tripper-magnet $d^8$, which would result in said tripper-magnet $d^8$ immediately releasing the automatic mechanism by means of which the knife-switch is positively opened. Thus it will be seen that the several conditions above referred to are provided for.

$m$ $m'$ represent two storage batteries, either one of which may be connected with the terminals 12 and 14 by means of the switches $m^2$ $m^3$.

I claim—

1. A charging-circuit, an intermediate branch circuit containing a polarized relay, a storage battery, a switch for connecting said storage battery with said intermediate branch circuit, another switch for connecting the charging-circuit with said intermediate branch circuit, and means for opening said last-named switch operated by said polarized relay in case the storage battery is not connected with the branch circuit in correct polarity, substantially as described.

2. A charging-circuit, an intermediate branch circuit containing a polarized relay, a storage battery, a switch for connecting said storage battery with said intermediate branch circuit, another switch for connecting the charging-circuit with said intermediate branch circuit, an actuator for opening said last-named switch, a locking device for locking said actuator, and means for releasing said locking device operated by said polarized relay in case the storage battery is not connected with the branch circuit in correct polarity, substantially as described.

3. A charging-circuit, an intermediate branch circuit containing a polarized relay, a storage battery, a switch for connecting said storage battery with said intermediate branch circuit, another switch for connecting the charging-circuit with said intermediate branch circuit, a spring-pressed actuator for opening said last-named switch, a detent for said actuator into engagement with which said actuator is moved when said switch is closed, and means for moving said detent to release said actuator operated by said polarized relay in case the storage battery is not connected with the branch circuit in correct polarity, substantially as described.

4. A charging-circuit, an intermediate branch circuit containing a polarized relay, a storage battery, a switch for connecting said storage battery with said intermediate branch circuit, another switch for connecting the charging-circuit with said intermediate branch circuit, an actuator for opening said last-named switch, a locking device for locking said actuator, a tripping-magnet for releasing said locking device the circuit of which is actuated by said polarized relay in case the storage battery is not connected with the branch circuit in correct polarity, substantially as described.

5. A charging-circuit, a storage battery, a switch for connecting said charging-circuit with said storage battery, an actuator for opening said switch, a tripping-magnet for releasing said actuator, a normally open shunt-circuit for said tripping-magnet connected with the charging-circuit when said switch is closed, a polarized relay connected in circuit with said charging-circuit and storage battery when said switch is closed, a circuit-closer operated by said polarized relay for closing said shunt-circuit containing said tripping-magnet in case the storage battery is not connected in correct polarity, substantially as described.

In testimony whereof I have signed my name to this specification in the presence of two subscribing witnesses.

NATHAN H. SUREN.

Witnesses:
B. J. NOYES,
J. L. HUTCHINSON.